US012566729B2

(12) United States Patent
Karuppusamy et al.

(10) Patent No.: US 12,566,729 B2
(45) Date of Patent: Mar. 3, 2026

(54) METHOD AND SYSTEM FOR DYNAMIC PARTITIONING OF A FILE SYSTEM TO MANAGE A DIRECTORY TREE

(71) Applicant: Dell Products L.P., Round Rock, TX (US)

(72) Inventors: Ramesh Kannan Karuppusamy, Bengaluru (IN); Arun Kumar, Bengaluru (IN); Deepa H Mudiyappanavar, Gadag (IN); Lomesh Vasant Meshram, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/606,264

(22) Filed: Mar. 15, 2024

(65) Prior Publication Data

US 2025/0291766 A1     Sep. 18, 2025

(51) Int. Cl.
| | |
|---|---|
| *G06F 17/00* | (2019.01) |
| *G06F 7/00* | (2006.01) |
| *G06F 16/16* | (2019.01) |
| *G06F 16/185* | (2019.01) |

(52) U.S. Cl.
CPC .......... *G06F 16/162* (2019.01); *G06F 16/185* (2019.01)

(58) Field of Classification Search
CPC .............................. G06F 16/162; G06F 16/185

USPC ........................................................ 707/829
See application file for complete search history.

(56) References Cited

U.S. PATENT DOCUMENTS

| | | | | |
|---|---|---|---|---|
| 9,003,162 B2 * | 4/2015 | Lomet | ................. | G06F 16/2246 |
| | | | | 707/999.2 |
| 10,417,190 B1 * | 9/2019 | Donlan | ................. | G06F 16/128 |
| 2011/0258391 A1 * | 10/2011 | Atkisson | ............. | G06F 12/0804 |
| | | | | 711/E12.017 |
| 2012/0011106 A1 * | 1/2012 | Reid | ................... | G06F 16/2329 |
| | | | | 707/703 |
| 2012/0198175 A1 * | 8/2012 | Atkisson | ............. | G06F 12/0833 |
| | | | | 711/135 |

* cited by examiner

*Primary Examiner* — Pavan Mamillapalli
(74) *Attorney, Agent, or Firm* — Chamberlain, Hrdlicka, White, Williams & Aughtry; Aly Z. Dossa

(57) ABSTRACT

A method for managing a file system includes: receiving a directory tree delete request from a user via a computing device; in response to the request, making a determination that the directory tree associated with the file system is marked as a detachable directory, in which, before sending the request, the user marks the directory tree as the detachable directory; based on the determination and in real-time or near real-time, deleting the directory tree by removing an associated internal node from a B+ tree that is associated with the file system; initiating notifying of the user about a completion of the request; and after the initiating, reclaiming storage space associated with the directory tree in a garbage collection cycle.

19 Claims, 9 Drawing Sheets

System 100

FIG. 2.1

*Different Key Formats used in the B+ Tree*

An Index Node (Inode) Key Format: [<dtree_id>:<parent inode no>]:[<dtree_id>:<inode no>]

A Directory Entry Key Format: [<dtree_id>:<parent inode no>]:[<dtree_id>:<inode no>]

A Case Insensitive (CI) Hash Key Format: [<dtree_id>:<parent inode no>]:<CI Hash>

A Case Sensitive (CS) Hash Key Format: [<dtree_id>:<parent inode no>]:<CS Hash>

FIG. 2.2

Delete a directory tree that is
a detachable directory tree
(comparing to FIG. 2.1)

Root

INT3

INT2

INT11

L1          L2 m1/d1/dtree_id = 1

FIG. 2.3

A B+ Tree for "m2" file system

A B+ Tree for "m1" file system make a reference

Root → INT3 → INT2

INT12 → L2
INT12 → L1 m2/d3/dtree_id = 3

INT12 → L4
INT12 → L3 m1/d2/dtree_id = 2

INT11 → L2
INT11 → L1 m1/d1/dtree_id = 1

Copy a directory tree that is a detachable directory tree (comparing to FIG. 2.1)

FIG. 2.4

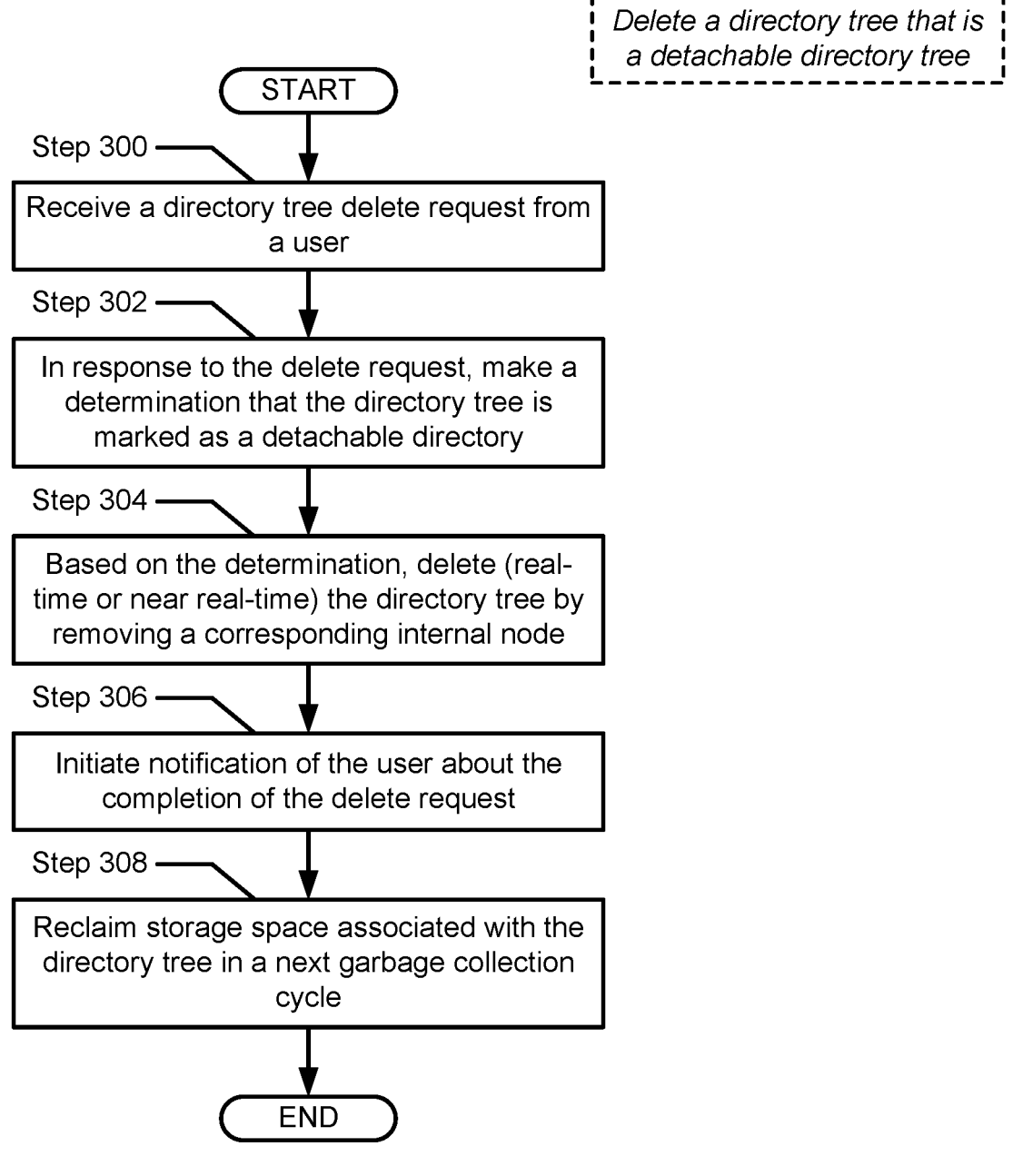

Delete a directory tree that is a detachable directory tree

START

Step 300

Receive a directory tree delete request from a user

Step 302

In response to the delete request, make a determination that the directory tree is marked as a detachable directory Step 304

Based on the determination, delete (real-time or near real-time) the directory tree by removing a corresponding internal node Step 306

Initiate notification of the user about the completion of the delete request

Step 308

Reclaim storage space associated with the directory tree in a next garbage collection cycle

END

FIG. 3

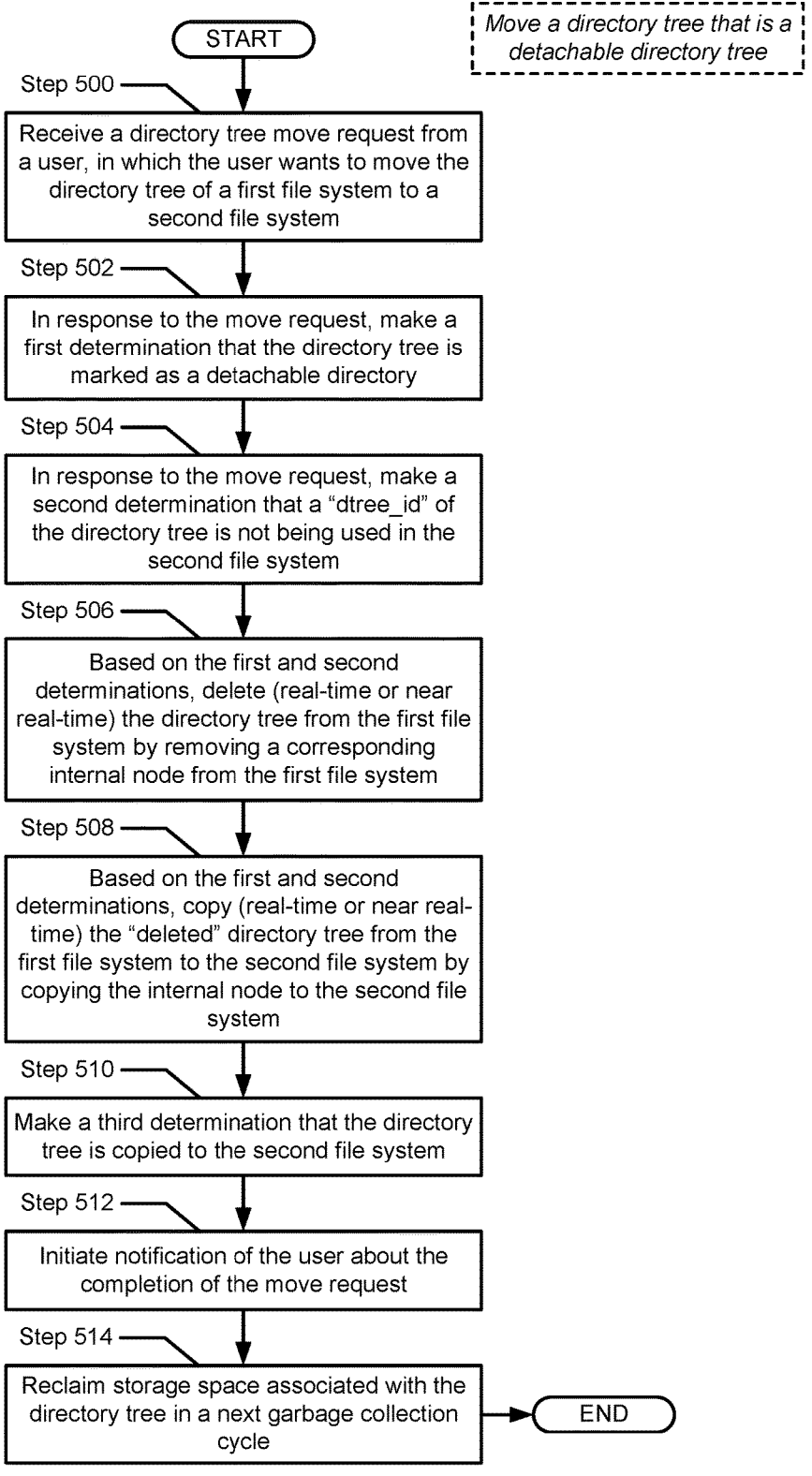

```
                                    ┌─────────────────────────────┐
              ( START )             ┊ Move a directory tree that is a ┊
Step 500 ─┐       │                 ┊   detachable directory tree     ┊
          ▼                         └─────────────────────────────┘
┌─────────────────────────────┐
│ Receive a directory tree move request from│
│ a user, in which the user wants to move the│
│ directory tree of a first file system to a │
│        second file system          │
└─────────────────────────────┘
Step 502 ─┐       │
          ▼
┌─────────────────────────────┐
│ In response to the move request, make a │
│ first determination that the directory tree is│
│    marked as a detachable directory    │
└─────────────────────────────┘
Step 504 ─┐       │
          ▼
┌─────────────────────────────┐
│ In response to the move request, make a │
│ second determination that a "dtree_id" of│
│ the directory tree is not being used in the│
│          second file system         │
└─────────────────────────────┘
Step 506 ─┐       │
          ▼
┌─────────────────────────────┐
│        Based on the first and second       │
│ determinations, delete (real-time or near │
│ real-time) the directory tree from the first file│
│      system by removing a corresponding    │
│    internal node from the first file system  │
└─────────────────────────────┘
Step 508 ─┐       │
          ▼
┌─────────────────────────────┐
│        Based on the first and second       │
│ determinations, copy (real-time or near real-│
│ time) the "deleted" directory tree from the │
│ first file system to the second file system by│
│ copying the internal node to the second file │
│                 system               │
└─────────────────────────────┘
Step 510 ─┐       │
          ▼
┌─────────────────────────────┐
│ Make a third determination that the directory│
│   tree is copied to the second file system  │
└─────────────────────────────┘
Step 512 ─┐       │
          ▼
┌─────────────────────────────┐
│ Initiate notification of the user about the │
│     completion of the move request      │
└─────────────────────────────┘
Step 514 ─┐       │
          ▼
┌─────────────────────────────┐
│ Reclaim storage space associated with the │──▶( END )
│ directory tree in a next garbage collection │
│                  cycle               │
└─────────────────────────────┘
```

FIG. 5

METHOD AND SYSTEM FOR DYNAMIC PARTITIONING OF A FILE SYSTEM TO MANAGE A DIRECTORY TREE

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 2.2 shows different key formats used in a B+ tree in accordance with one or more embodiments disclosed herein.

FIG. 2.3 shows an example use case to delete a directory tree that is a detachable directory tree in accordance with one or more embodiments disclosed herein.

FIG. 2.4 shows an example use case to copy a directory tree that is a detachable directory tree in accordance with one or more embodiments disclosed herein.

FIG. 5 shows a method for moving a directory tree that is a detachable directory tree in accordance with one or more embodiments disclosed herein.

DETAILED DESCRIPTION

Figure 1:
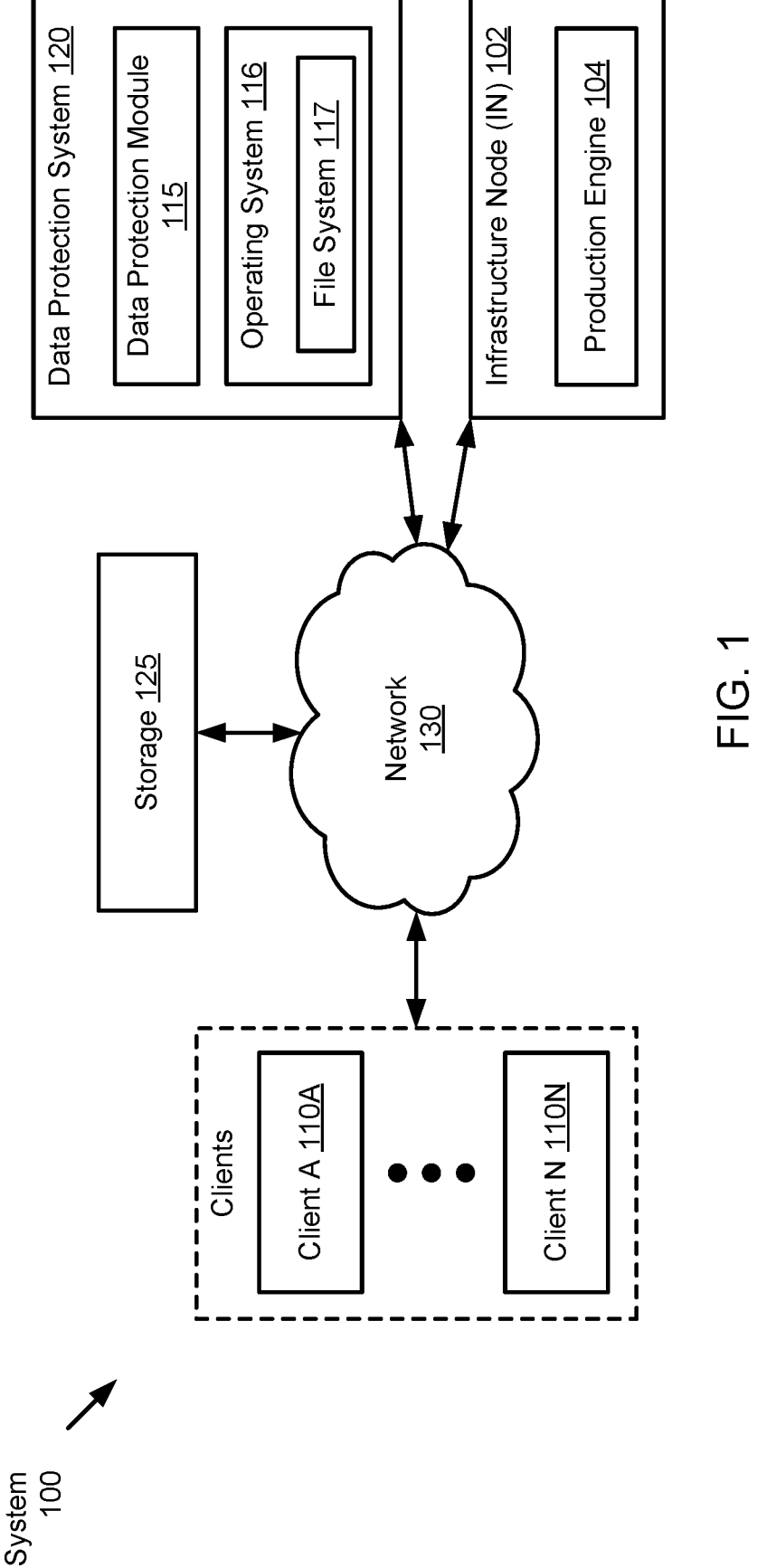
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout the application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, log-structured file systems offer various different opportunities for managing data, especially for deleting data (e.g., files, folders, etc.), unlike conventional file systems (e.g., a third extended file system (ext3), a fourth extended file system (ext4), a new technology file system (NTFS), etc.) because deletion of a portion of the data occurs independently through garbage collection. For example, conventional file systems delete files synchronously or conventional file systems delete large files through individual asynchronous tasks, which includes managing complex asynchronous tasks across crash recovery scenarios. As yet another example, conventional file systems perform "write-in-place" approach to write data, whereas log-structured file systems enable recovery of data that has been deleted until a garbage collection process is initiated.

As being a log-structured file system, a DataDomain file system (i) provides a functionality to share its underlying data set across the file system (which is important because, for example, in a storage device, multiple file systems (e.g., File System A and File System B) may be generated and File System A may not share any data with File System B) and (ii) each file in the DataDomain file system is represented by a content handle (e.g., a unique identifier for a file that is similar to an index node (inode) number in a Linux based file system). For example, copying a file from one namespace/location to another namespace involves generating a namespace entry and pointing that namespace entry to the same "content handle" of a corresponding source file.

Referring to the DataDomain file system (or in any other file system), there may be cases where a directory tree (of a corresponding file system) needs to be deleted and/or moved. In particular for data protection systems (e.g., a DataDomain system), deleting and/or moving a directory tree may be performed frequently because, for example, a data backup (or a data backup set) may be expired over time and the directory tree representing the data backup may need to be deleted upon backup expiry. This procedure may be performed by implementing "readdir" command/function over the directory tree and by issuing a delete request for each files and/or sub-directories in that directory tree.

Further, in some cases, a directory tree may need to be copied from one namespace to another namespace. For example, in the case of a Cyber Recovery Solution (e.g., a cyber-security solution that is built on top of a DataDomain system), an entire data backup set (e.g., a full backup of a data set) may need to be copied from one namespace to another namespace on a regular basis, in which this process may involve going through a directory tree representing the data backup set and copying corresponding files one by one to a destination.

In a conventional backup workload, a data backup set may include one or more large files and, because of that, most file systems (executing on data backup systems) are optimized to handle such workloads. However, most of the conventional backup workloads (e.g., Hadoop, Cyber Recovery Solution, etc.) host/present a large number of small files that may directly affect the corresponding file system's operations (e.g., production workloads).

Further, the aforementioned problems become even more critical in distributed data backup systems as, for example, traversing an entire directory tree may mean traversing the entire directory tree across a distributed data backup system.

For at least the reasons discussed above and without requiring resource-intensive efforts (e.g., conventional approaches require traversing an entire directory tree recursively and performing, for example, a delete operation by deleting each file one by one, which consumes a lot of time and computing resources), a fundamentally different approach/framework is needed (e.g., a framework to manage an entire directory tree deletion process, copying process, or moving process via one or more detachable directories, in which the framework takes advantages of a log-structured file system (e.g., a file system that does not delete data as soon as newer data is written) and the underlying shared nature of a corresponding data set across the system).

Embodiments disclosed herein relate to methods and systems for managing a file system. As a result of the processes discussed below, one or more embodiments disclosed herein advantageously ensure that: (i) an entire directory tree can be deleted instantaneously (e.g., in real-time (on the order of milliseconds (ms) or less) or near real-time); (ii) an accidental deletion of a directory tree can be recovered (e.g., by performing a rollback operation); (iii) an entire directory tree can be copied instantaneously from one namespace (e.g., a source, a first file system, etc.) to another namespace (e.g., a target, a second file system, etc.); (iv) an entire directory tree can be moved instantaneously from one namespace (e.g., a source, a first file system, etc.) to another namespace (e.g., a target, a second file system, etc.); (v) traversing an entire directory (to perform a deletion process, a copying process, or a moving process) is prevented for not consuming a lot of time and computing resources (while performing those processes); (vi) a file system application (e.g., that executes on a client) can mark a directory (or a directory tree) as a detachable directory (or a detachable directory tree); and/or (vii) once a directory is marked, data set (e.g., files, folders, etc.) associated with the directory is maintained in such a way that the directory can be deleted, copied, or moved instantaneously (for a better user experience).

The following describes various embodiments disclosed herein.

FIG. 1 shows a diagram of a system (100) in accordance with one or more embodiments disclosed herein. The system (100) includes any number of clients (e.g., Client A (110A), Client B (110B), etc.), a network (130), any number of infrastructure nodes (INs) (e.g., 102), a data protection system (120), and storage (125). The system (100) may include additional, fewer, and/or different components without departing from the scope of the embodiments disclosed herein. For example, while shown as including only one IN (102), the system (100) may include more INs (e.g., a group of INs including at least fifty INs). Each component may be operably/operatively connected to any of the other components via any combination of wired and/or wireless connections. Each component illustrated in FIG. 1 is discussed below.

In one or more embodiments, the clients (e.g., 110A, 110B, etc.), the IN (102), the network (130), the data protection system (120), and the storage (125) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110B, etc.) and the IN (102) are shown to be operatively connected through a communication network (e.g., 130), the clients (e.g., 110A, 110B, etc.) and the IN (102) may be directly connected (e.g., without an intervening communication network).

Further, the functioning of the clients (e.g., 110A, 110B, etc.) and the IN (102) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, digital information, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time network monitoring, server virtualization, etc.), storage capacity (e.g., data backup), and data protection (e.g., software-defined data protection, disaster recovery, etc.) as a service to users of clients (e.g., 110A, 110B, etc.). For example, the system may be configured to organize unbounded, continuously generated data into a data stream. The system (100) may also represent a comprehensive middleware layer executing on computing devices (e.g., 600, FIG. 6) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, a VM may be a logical entity executed using computing resources of, for example, a production engine (104) or using computing resources of other computing devices (e.g., mobile phones, tablet computers, laptop computers, desktop computers, servers, distributed computing systems, cloud resources, etc.) connected to the IN (102). A VM (and applications hosted by the VM) may generate data (e.g., VM data) that is stored in, for example, persistent storage of the IN (102). In one or more embodiments, the VM data may reflect the state of the VM.

A VM may provide services to the clients (e.g., 110A, 110B, etc.). For example, a VM may host instances of databases, email servers, or other applications that are accessible to the clients (e.g., 110A, 110B, etc.). The VM may host other types of applications not listed above without departing from the scope of the embodiments disclosed herein.

To provide computer-implemented services to the users, the system (100) may perform some computations (e.g., data collection, distributed processing of collected data, etc.) locally (e.g., at the users' site using the clients (e.g., 110A, 110B, etc.)) and other computations remotely (e.g., away from the users' site using the IN (102) and/or the data protection system (120)). By doing so, the users may utilize different computing devices (e.g., 600, FIG. 6) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110B, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (102)), store, or otherwise utilize captured sensor data (and/or any other type and/or quantity of data), (iv) provide surveillance services (e.g., determining object-level information, performing face recognition, etc.) for scenes (e.g., a physical region of space), and/or (v) send instructions to the production engine (104) to configure one or more VMs (for example, the instructions may include, but are not limited to: instructions for configuring a backup policy, instructions for taking a snapshot of data (e.g., a point-in-time copy of file system data) on the data protection system (120), etc.). One of ordinary skill will appreciate that the client may perform other functionalities without departing from the scope of the embodiments disclosed herein.

In one or more embodiments, the clients (e.g., 110A, 110B, etc.) may be geographically distributed devices (e.g., user devices, front-end devices, etc.) and may have relatively restricted hardware and/or software resources when compared to the IN (102). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110B, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110B, etc.) may correspond to computing devices that one or more users use to interact with one or more components of the system (100).

In one or more embodiments, a client (e.g., 110A, 110B, etc.) may include/host any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110B, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110B, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110B, etc.) may utilize, rely on, or otherwise cooperate with the IN (102) and/or the data protection system (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110B, etc.) may be capable of, e.g.: (i) collecting users' inputs, (ii) correlating collected users' inputs to the computer-implemented services to be provided to the users, (iii) communicating with the IN (102) that perform computations necessary to provide the computer-implemented services, (iv) using the computations performed by the IN to provide the computer-implemented services in a manner that appears (to the users) to be performed locally to the users, and/or (v)

communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110B, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110B, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (102), the data protection system (120), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110B, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110B, etc.) may be, for example (but not limited to): a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of DRAM and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 6:
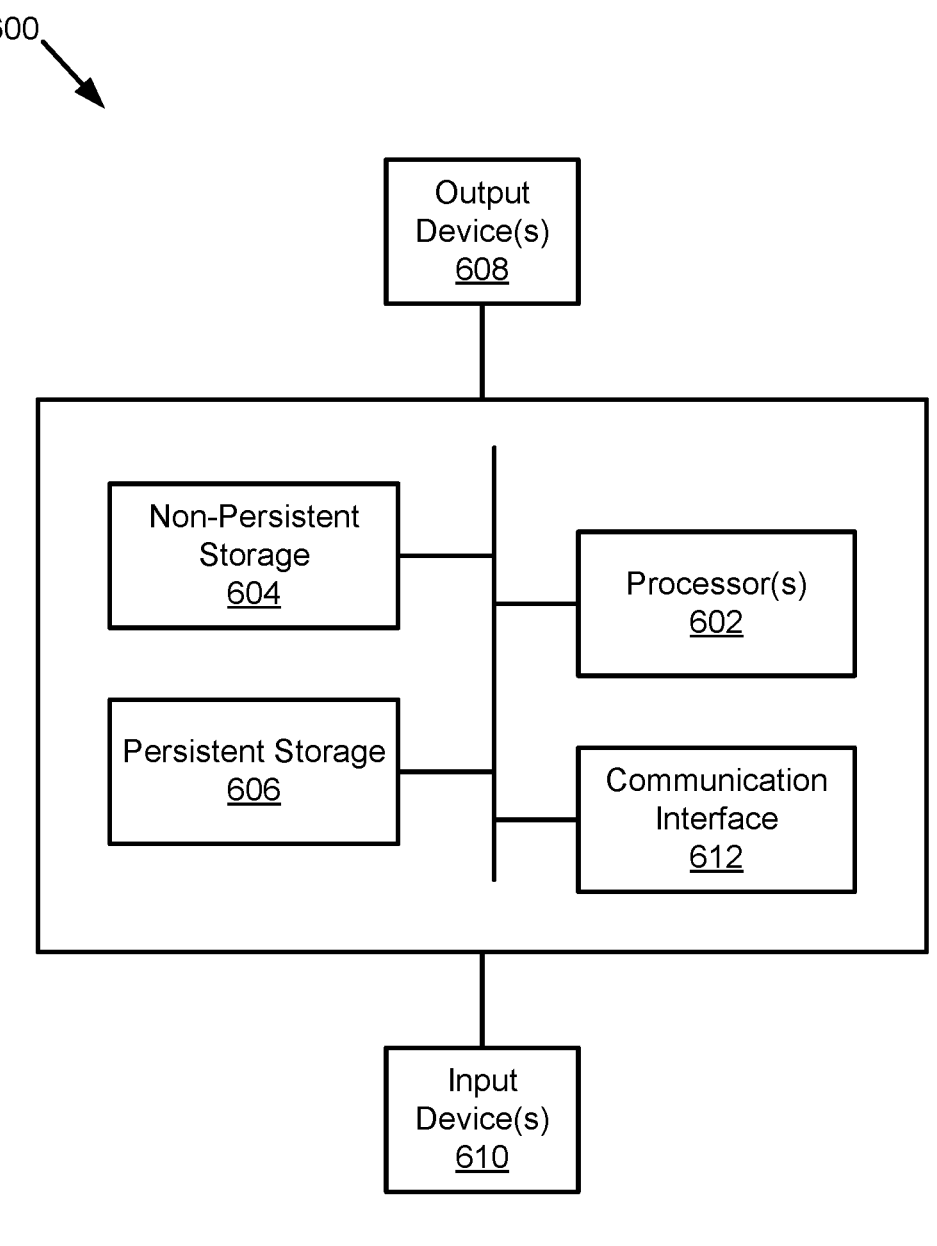
FIG. 6 shows a diagram of a computing device in accordance with one or more embodiments disclosed herein.

Further, in one or more embodiments, a client (e.g., 110A, 110B, etc.) may be implemented as a physical computing device (e.g., 600, FIG. 6). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110B, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110B, etc.) in order to perform work-related tasks (e.g., production workloads (e.g., reading data from a table, writing data to the table, etc.)). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (102) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (102) (more specifically, the production engine (104)) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110B, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the storage (125) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features (in conjunction with the data protection module (115)) to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the IN may split up a request (e.g., an operation, a task, an activity, etc.) with another IN, coordinating its efforts to complete the request more efficiently than if the IN had been responsible for completing the request); (xi) provide (in conjunction with the data protection module (115)) software-defined data protection for the clients (for example, data generated for the clients may be valuable to the corresponding users, and therefore may be protected by the data protection module); (xii) provide (alternatively or in conjunction with the data protection module (115)) automated data discovery, protection, backup, management, and recovery operations for the clients); (xiii) monitor operational states of the clients; (xiv) regularly back up (in conjunction with the data protection module (115)) configuration information of the clients to the storage (125); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or to the storage; (xvii)

provide data deduplication; (xviii) orchestrate data protection through one or more GUIs; (xix) empower (in conjunction with the data protection module (115)) data owners (e.g., users of the clients) to perform self-service data backup and restore operations from their native applications; (xx) ensure compliance and satisfy different types of service level objectives (SLOs) set by an administrator/user; (xxi) increase (in conjunction with the data protection module (115)) resiliency of an organization by enabling rapid recovery or cloud disaster recovery from cyber incidents; (xxii) provide operational simplicity, agility, and flexibility for physical, virtual, and cloud-native environments; (xxiii) consolidate (in conjunction with the data protection module (115)) multiple data processing and/or protection requests (received from, for example, clients) so that duplicative operations (which may not be useful for restoration purposes) are not generated; (xxiv) initiate multiple data processing and/or protection operations in parallel (e.g., an IN may host multiple operations, in which each of the multiple operations may (a) manage the initiation of a respective operation and (b) operate concurrently to initiate multiple operations); (xxv) manage operations of one or more clients (e.g., receiving information from the clients regarding changes in the operation of the clients) to improve their operations (e.g., improve the quality of data being generated, decrease the computing resources cost of generating data, etc.), and/or (xxvi) issue commands to a hypervisor (executing on the IN (102)) to control an operation of a VM (executing on the IN (102)) when a backup of the VM is being generated (in conjunction with the data protection module (115)), or when a restoration of the VM is being performed (in conjunction with the data protection module (115)).

In one or more embodiments, in order to read, write, or store data, the production engine (104) may communicate with, for example, the storage (125) and/or other storage devices in the system (100).

One of ordinary skill will appreciate that the production engine (104) may perform other functionalities without departing from the scope of the embodiments disclosed herein. The production engine (104) may be implemented using hardware (e.g., a physical device including circuitry), software, or any combination thereof.

As described above, the IN (102) may be capable of providing a range of functionalities/services to the users of the clients (e.g., 110A, 110B, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (102) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (102) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110B, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (102) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system, small workloads with lower priority workloads (e.g., FS host data, operating system data, etc.), medium workloads with higher priority (e.g., VM with FS data, network data management protocol (NDMP) data, etc.), large workloads with critical priority (e.g., mission critical application data), etc.

As used herein, a "policy" is a container or other collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term "backup" is intended to be broad in scope. In this manner, example backups (in connection with the embodiments disclosed herein) may include (but not limited to): full backups, partial backups, clones, snapshots, incremental backups, differential backups, etc.

As used herein, "data retention" is a period of time, with a definite start and end, within which the data should be retained in storage (e.g., 125). For example, a set of user requirements and/or technical considerations (e.g., security considerations, performance considerations, etc.) of a data center may be used to generate a data retention policy specifying that user data should be retained in the storage for seven years.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic, for example, as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window.

Further, while a single IN (102) is considered above, the term "node" includes any collection of systems or subsystems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and/or different services that form the cooperatively provided service).

As described above, the IN (102) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (102) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (102) may perform other functionalities without departing from the scope of the embodiments disclosed herein.

In one or more embodiments, the IN (102) may be implemented as a physical computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110B, etc.), the IN may also be implemented as a logical device.

In one or more embodiments, the data protection system (120) hosts, at least, the data protection module (115) and an operating system (116). The data protection module (115) and the operating system (116) may be physical or logical entities, as discussed below.

Referring to FIG. 1, the data protection module (115) may be part of the data protection system (120), may execute as a standalone computing device, or may execute on any of the components of the system (100). For example, the data protection module (115) may be part of the IN (102) or other components of the system (100).

In one or more embodiments, as being a physical computing device or a logical computing device, the data protection module (115) may include functionality to, at least: (i) provide software-defined data protection (e.g., protecting data against loss); (ii) provide automated data discovery, protection, management, and recovery operations (e.g., to reconstruct data following loss) in on-premises; (iii) provide data deduplication; (iv) orchestrate centralized data protection through its GUI (e.g., by its GUI, the module may provide users an item level view of backups); (v) empower data owners to perform self-service data backup and restore operations from their native applications; (vi) ensure compliance and satisfy different types of SLOs; (vii) enable virtualized and cloud deployments, including automated data discovery, protection, management, and recovery operations for in-cloud workloads; (viii) enable data discovery, protection, management, and recovery operations for cloud-native workloads (e.g., an application that was designed to reside in a cloud environment) across multiple cloud environments; (ix) simplify VM image backups of a VM with near-zero impact on the VM; (x) streamline data protection for applications and/or containers (e.g., Kubernetes® containers); (xi) increase resiliency of an organization by enabling rapid recovery or cloud disaster recovery from cyber incidents; (xii) provide long-term data retention (in conjunction with the storage (125)); (xiii) provide dynamic NAS backup and recovery; and/or (xiv) provide operational simplicity, agility, and flexibility for physical, virtual, and cloud-native information technology (IT) environments.

In one or more embodiments, the data protection module (115) may further include functionality to, at least: (i) delete an entire directory tree (see FIGS. 2.1 and 2.3) instantaneously (e.g., in real-time or near real-time); (ii) recover an accidental deletion of a directory tree (e.g., by performing a rollback operation); (iii) copy an entire directory tree instantaneously from one namespace (e.g., a source, a first file system, etc.) to another namespace (e.g., a target, a second file system, etc.); (iv) move an entire directory tree instantaneously from one namespace (e.g., a source, a first file system, etc.) to another namespace (e.g., a target, a second file system, etc.); (v) prevent traversing an entire directory (to perform a deletion process, a copying process, or a moving process) for not consuming a lot of time and computing resources (while performing those processes); (vi) in conjunction with a file system application executing on a client (e.g., 110A, 110B, etc.), mark a directory (or a directory tree) as a detachable directory (see FIG. 2.1) (e.g., as soon as a user (via the client) initiates generation of a directory, the user (via the client) sends a request to the data protection module to mark the directory as the detachable directory); and/or (vii) once a directory is marked, maintain a data set (e.g., assets) associated with the directory in such a way that the directory can be deleted, copied, or moved instantaneously.

One of ordinary skill will appreciate that the data protection module (115) may perform other functionalities without departing from the scope of the embodiments disclosed herein.

As discussed above, the data protection module (115) may provide data protection (e.g., data backup, data management, data restore, etc.) services to the production engine (104) (or any other component of the system (100)). The data protection services may initiate (e.g., instantiate, execute, etc.) generation and storage of backups (e.g., block-based backups, file-based backups (e.g., a file-based backup is a backup of a file system (e.g., 117) that has been updated, modified, and/or otherwise accessed by the production engine (104)), etc.) in the storage (125). The data protection services may also include restoration of the production engine (104) (or any other component of the system (100)) to a restoration host (e.g., a secondary storage system, not shown) using the backups stored (temporarily or permanently) in the storage (125) and in accordance with restoration procedures initiated by one or more entities in the system (100).

As being a separate computing device that coordinates backups and restorations (and either includes or communicates with a backup storage (e.g., 125) for storing a completed backup and other data), the data protection module (115) may provide data protection services to the production engine (104) (or any other component of the system (100)) by orchestrating (or scheduling): (i) generation of backups of the production engine (104) (e.g., generation of backups of assets (e.g., files, folders, etc.) associated with the production engine); (ii) storage of the generated backups of the production engine (104) in the storage (125); (iii) consolidation of one or more backup requests to reduce (or to prevent) generation of backups that are not useful for restoration purposes; and/or (iv) restoration of the production engine (104) to previous states using backups stored in the storage (125). To provide the aforementioned services, the data protection module (115) may include functionality to generate and issue instructions to any other component of the system (100). The data protection module (115) may also generate instructions in response to data protection requests from other entities/devices.

The data protection module (115) may generate such instructions in accordance with backup schedules that specify when backups are to be generated. In one or more embodiments, a backup schedule may lay out specific points in time for a backup process to be performed. Additionally, these backup schedules may be configured based on a user's recovery point objective (RPO).

In one or more embodiments, the data protection module (115) may generate and provide to the storage (125) backup data, backup metadata, as well as any other data that is produced by the data protection module (115) in the process of performing a backup based on backup policies implemented by the data protection module (115). The backup policies may specify a schedule in which assets associated with the production engine (104) and/or clients (e.g., 110A, 110B, etc.) are to be backed up. The backups may take the form of either a full or incremental backup as well as any other type of backup.

For example, the data protection module (115) may be triggered to generate a backup along with backup metadata and provide the backup and its metadata to the storage (125) in response to a backup policy. Alternatively, backup, and backup metadata may be generated by the data protection module (115) and provided to the storage (125) in response to a backup request triggered by a client (e.g., 110A) or a user of the client.

As discussed above, the data protection module (115) may restore backup metadata and backup data stored in the storage (125). When the data protection module (115) (or other equivalent component of the system (100)) receives a request for a restoration of a backup (e.g., at a later time after performing the backup), the data protection module (115) (or the equivalent component) retrieves the metadata and data stored in the storage (125) and restores the data (without reorganizing) to its original location in, for example, the IN (102). Alternatively, in one or more embodiments disclosed herein, the data in the backup may be restored to a file system located in a different IN/host than where it was originally restored as directed by a user, administrator, or other party that requested the restoration. Other methods for restoring the backup may be used and the embodiments disclosed herein are not limited to those described above.

Further, the data protection module (115) includes functionality for generating a file system backup and a file system metadata backup associated with data of the file system (117) (e.g., file system data), in which the file system backup may be generated by copying at least the file system data and storing the copy in the storage (125). Similarly, the file system metadata backup may be generated by copying at least the metadata and storing the copy in the storage (125), in which the metadata backup may be stored as files that are separate from the file system backup.

In one or more embodiments, the data protection module (115) may obtain a status of a backup (e.g., a block-based backup (BBB)) from the storage (125). The status of the BBB may specify information such as: (i) whether the BBB was successful and whether the backup was completed within a BBB window (e.g., 100% of the BBB was completed within the BBB window), or (ii) whether the BBB was unsuccessful and how much of the BBB was not completed within the BBB window (e.g., 70% of the BBB was completed and 30% of the BBB was not completed). In one or more embodiments, the BBB window may be a period of time, with a definite start and end, within which a BBB is set to be completed.

In one or more embodiments, the data protection module (115) may include a backup monitoring service for monitoring a status of a backup (e.g., a BBB). The backup monitoring service may be a computer program that may be executed on the underlying hardware of the data protection module (115). The backup monitoring service may also be designed and configured to facilitate remote access to check the status of and/or manipulate locally stored data during the BBB. Further, the backup monitoring service may include functionality to control remote procedure calls (e.g., application programming interface (API) calls) that access and manipulate any granularity of the locally stored data during the BBB.

As discussed above, the data protection module (115) may be configured to orchestrate a data restoration process (e.g., restoration of the IN (102) to a recovery node using backups stored in the storage (125)). For example, when a backup of the IN (102) is completed (at a first point-in-time) and once the production engine (104) is failed, the data protection module (115) may initiate a restoration process (at a second point-in-time, which is later than the first point-in-time) to restore the IN. Based on initiating the data restoration process, a user of Client A (110A) may select one or more assets to restore from the backup of the IN (102) via a GUI. In one or more embodiments, the data protection module (115) or Client A (110A) may provide the GUI to the user.

Continuing with the discussion of the example, once the user has selected the assets via the GUI, the data protection module (115) may make an API call to the storage (125) to access the selected assets in the backup. Based on receiving the API call from the data protection module (115), the storage (125) may allow the data protection module (115) to access the backup. The data protection module (115) may then read data of the selected assets from the backup. The data protection module (115) may then restore the selected assets to the recovery host in accordance with file system metadata associated with the selected assets.

Further, the data protection module (115) may include functionality to consolidate multiple restore requests (received from a user of a client) to prevent generation of duplicative restorations (e.g., of the IN (102)), in which preventing the generation of duplicative restorations may reduce a restoration window. In one or more embodiments, the restoration window may be a period of time, with a definite start and end, within which an asset restoration is set to be completed. Separately, the data protection module (115) may include functionality to initiate multiple restorations in parallel. For example, the data protection module (115) may host multiple restoration processes. Each of the multiple restoration processes may manage the initiation of a respective restoration. Each of the multiple restoration processes may operate concurrently to initiate multiple restorations.

In one or more embodiments, the operating system (116) may refer to a computer program that may execute on the underlying hardware of the data protection system (120), which may be responsible for overseeing data protection module (120) operations. For example, the operating system (116) may include any program of executable instructions (or aggregation of programs of executable instructions) configured to manage and/or control the allocation and usage of hardware resources such as memory, processor time, disk space, and input/output devices, and provide an interface between such hardware resources and applications hosted by the operating system (116).

In one or more embodiments, at least in part, the operating system (116) may include functionality to: (i) support fundamental data protection system (120) functions; (ii) schedule tasks; (iii) mediate interactivity between logical (i.e., software) and physical (i.e., hardware) data protection system (120) subcomponents; (iv) allocate hardware or logical resources of the data protection system (120) as needed; and/or (v) execute or invoke other computer programs (e.g., the data protection module (115)) executing on the data protection system (120). One of ordinary skill, however, will appreciate that the operating system (116) may perform other functionalities without departing from the scope of the embodiments described herein.

For example, the operating system (116) may facilitate access and interaction with locally stored information (e.g., application, user, and/or service data and metadata) by other computer program(s) executing on the data protection system (120). In facilitating said access and interaction, the operating system (116) may implement a file system (117). The file system (117) may refer to a physical file system (or file system implementation), which may reference a collection of subroutines concerned with the physical operation of one or more physical storage devices(s) (e.g., 125). The file system (117), in this respect, may be concerned with the physical operation of at least a subset of the storage (125). Accordingly, the file system (117) may host storage device drivers (or firmware) to process requested file operations from other computing devices (e.g., 115, 104, etc.). Device drivers may enable the file system (117) to manipulate physical storage, in the form of disk blocks and/or file regions for example, as appropriate.

In one or more embodiments, the file system (117) may provide, at least, user login verification services, storage of directory information, user access management services, one or more APIs, certificate services, file system metadata management services, and/or domain management services. Other services may be provided by the file system (117) without departing from the scope of the embodiments disclosed herein. The file system (117) is implemented as computer instructions, e.g., computer code, stored on persistent storage (of the data protection system (120)) that when executed by a processor(s) of the data protection system, the data protection system provides the functionalities of the file system (117) described throughout this application.

In the embodiments of the present disclosure, the file system (117) is demonstrated as a part of the data protection system (120); however, embodiments disclosed herein are not limited as such. A second file system (not shown) may be a part of any other computing device (e.g., 102) executing on the system (100). For example, the production engine (104) may generate application/user data to be utilized for servicing of users (of the clients). The application data may be organized in accordance with the second file system. Similar to the file system (117), the second file system (e.g., a log-structured file system) may include any number of files and/or folders (e.g., used by the production engine (104)) organized into directories, in which the directories may include paths for accessing the files. The second file system may be stored in a container stored in persistent storage of the IN (102).

In one or more embodiments, file system data (e.g., data that is associated with the file system (117)) may include data for one or more files. Each file system data (also referred to as file data) may correspond to a file in the file system (117). The file data may further include data tags, in which the data tags may be associated with a storage format of the file data. For example, the file data may be stored in a common data streaming format (CDSF), in which the CDSF may be a format that includes data tags corresponding to a portion of data and may specify a file-based backup corresponding to the portion of data. In this manner, the file data may include, at least: (i) the data of the files and/or file system and (ii) the data tags that specify metadata of one or more portions of the file data.

As used herein, "file system metadata" may reflect (i) information descriptive of each file managed by the file system (117) and (ii) information regarding to an organizational structure of the file system (117). Examples of file system metadata, descriptive of any given asset, may include/specify (but not limited to): an identifier of an asset (e.g., "file_1", "folder_1", etc.); an identifier of a parent folder containing an asset (e.g., an identifier of a parent folder may be "folder_3/file_2", which specifies that "folder_3" contains "file_2"); an offset for data of an asset stored in a virtual hard disk (VHDX) (e.g., an offset for data of an asset may be a pointer that points to one or more blocks of a VHDX file that stores the data); a read/write attribute of an asset (e.g., Asset A is read-only, Asset B is hidden, etc.); a type of an asset reflecting a format through which the asset may be encoded for storage (e.g., a ".pdf" file, a ".doc" file, etc.); a size (e.g., expressed in bytes) of an asset (e.g., a size of an asset may specify how much storage space is consumed by the asset); a content of an asset (e.g., a legal document, an engineering design document, etc.); a generation timestamp encoding a date and/or time on which an asset had been generated (or first introduced); a modification timestamp encoding a date and/or time on which an asset had last been modified; any access permissions/levels associated with an asset (e.g., an access control list (ACL) of an asset that defines which user has access to the asset (e.g., the ACL of the asset may specify that a user with a user access level of 7 or above can access the asset)); an identifier of an owner (or a user) responsible for generating an asset; a hash value of file data; a checksum value of the file data; a header size; a directory service associated with an asset; a number of assets; an asset path specifying a location (within the file system (117)) (e.g., a/b/c/t.txt); a data block identifier associated with a data block of an asset; etc.

For example, consider a scenario in which file system metadata specifies (i) Folder A, (ii) File B, (iii) File A, (iv) Folder C, (v) Folder B, (vi) Folder D, (vii) File X, (viii) File Y, and (ix) File Z. In this scenario, each of the aforementioned contents of the file system metadata may not be currently configured in a hierarchical manner. Said another way, the contents of the file system metadata may be arranged in a random order. To this end, the operating system (116) may reorder the contents of the file system metadata to obtain a hierarchical structure (e.g., a file system hierarchy/index that specifies which folder contains which folder and/or which folder contains which file).

After the reordering, the file system hierarchy may also specify an access level of each asset (in which an access level of an asset specifies which user can view that asset (based on the user's access level)). For example, the file system hierarchy may specify that (i) Folder B contains Folder D (e.g., Folder B is a parent folder of Folder D) and (ii) the access level of Folder B is 4 and the access level of Folder D is 5. In this example, to be able to view Folder D, a user should have a user access level of at least 5 or higher.

In one or more embodiments, file system metadata may be stored in persistent storage of the data protection system (120). Information included in that persistent storage may be determined (by the data protection module (115)) as a normal function of the file system (117), in which this information may also be determined as a part of, for example, a metadata-based backup, or other functions requested by the production engine (104) (or other components of the system (100)). In one or more embodiments, the information may be used for determining an asset that is associated with a user, producing estimates of the size of the asset, determining where the asset is located, and/or other functions (that need to be performed by the data protection module) such as performing a backup.

Turning now to the storage (125), the storage (125) may provide long-term, durable, high read/write throughput data storage/protection with near-infinite scale and low-cost. The storage (125) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. For example, the storage (125) may store data (e.g., backup data; file system metadata; assets; rules and/or procedures for performing backups of the IN (102); etc.). Further, the storage (125) may also occupy a portion of a physical storage/memory device or, alternatively, may span across multiple physical storage/memory devices. The storage (125) may include other and/or additional functionalities without departing from embodiments disclosed herein.

In one or more embodiments, the storage (125) may be implemented using physical devices that provide data storage services (e.g., storing data and providing copies of previously stored data). The devices that provide data storage services may include hardware devices and/or logical devices. For example, the storage (125) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage (125) may include a memory device (e.g., a dual in-line memory device), in which data is stored and from which copies of previously stored data are provided. As yet another example, the storage (125) may include a persistent storage device (e.g., an SSD), in which data is stored and from which copies of previously stored data is provided. As yet another example, the storage (125) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the storage (125) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the storage (125) may store/log/record unstructured and/or structured data that may include (or specify), for example (but not limited to): an identifier of a user/customer; a backup policy/practice; telemetry data including past and present device usage of one or more computing devices; data for execution of applications/services including IN applications and associated end-points; corpuses of annotated data used to build/generate and train processing classifiers for trained ML models; linear, non-linear, and/or ML model parameters; data tags; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; an identifier of a user (e.g., a unique string or combination of bits associated with a particular user) who initiated a backup (via a client); a distributed model identifier that uniquely identifies a distributed model; a user activity performed on a data item; a cumulative history of user/administrator activity records obtained over a prolonged period of time; a setting (and a version) of a mission critical application executing on the IN (102); configuration information associated with the data protection module (115) and/or the production engine (104); a job detail of a job that has been initiated by the IN; a type of the job (e.g., a non-parallel processing job, a parallel processing job, an analytics job, etc.); information associated with a hardware resource set (discussed below) of the IN; a completion timestamp encoding a date and/or time reflective of the successful completion of a job; a time duration reflecting the length of time expended for executing and completing a job; a backup retention period associated with an asset (e.g., data item); a status of a job (e.g., how many jobs are still active, how many jobs are completed, etc.); a number of requests handled (in parallel) per minute (or per second, per hour, etc.) by the data protection system (120); a number of errors encountered when handling a job (e.g., a backup process); a documentation that shows how the data protection module (115) performs against an SLO and/or an SLA; a set of requests received by the production engine (104); a set of responses provided (by the production engine) to those requests; information regarding an administrator (e.g., a high priority trusted administrator, a low priority trusted administrator, etc.) related to a job; tier/level information of a user (e.g., a high-privileged user, a low-privileged user, etc.); etc.

In one or more embodiments, information associated with a hardware resource set (e.g., including at least resource related parameters) may specify, for example (but not limited to): a configurable CPU option (e.g., a valid/legitimate vCPU count for the IN (102)), a configurable network resource option (e.g., enabling/disabling single-root input/output virtualization (SR-IOV) for the IN (102)), a configurable memory option (e.g., maximum and minimum memory for the IN (102)), a configurable GPU option (e.g., allowable scheduling policy and/or virtual GPU (vGPU) count combinations for the IN (102)), a configurable DPU option (e.g., legitimacy of disabling inter-integrated circuit (I2C) for the IN (102)), a configurable storage space option (e.g., a list of disk cloning technologies across one or more INs in the system (100)), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the storage (125), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): a set of newer backup rules is received, an ongoing backup process is fully completed, a state of the data protection module (115) is changed, etc.

In the embodiments of the present disclosure, the storage (125) is demonstrated as a separate entity from the IN (102); however, embodiments disclosed herein are not limited as such. The storage (125) may be demonstrated as a part of the IN (e.g., as deployed to the IN (102)).

While the storage (125) has been illustrated and described as including a limited number and type of data, the storage (125) may store additional, less, and/or different data without departing from the scope of the embodiments disclosed herein. One of ordinary skill will appreciate that the storage (125) may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, the data protection system, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

While FIG. 1 shows a configuration of components, other system configurations may be used without departing from the scope of the embodiments disclosed herein.

Figure 2:
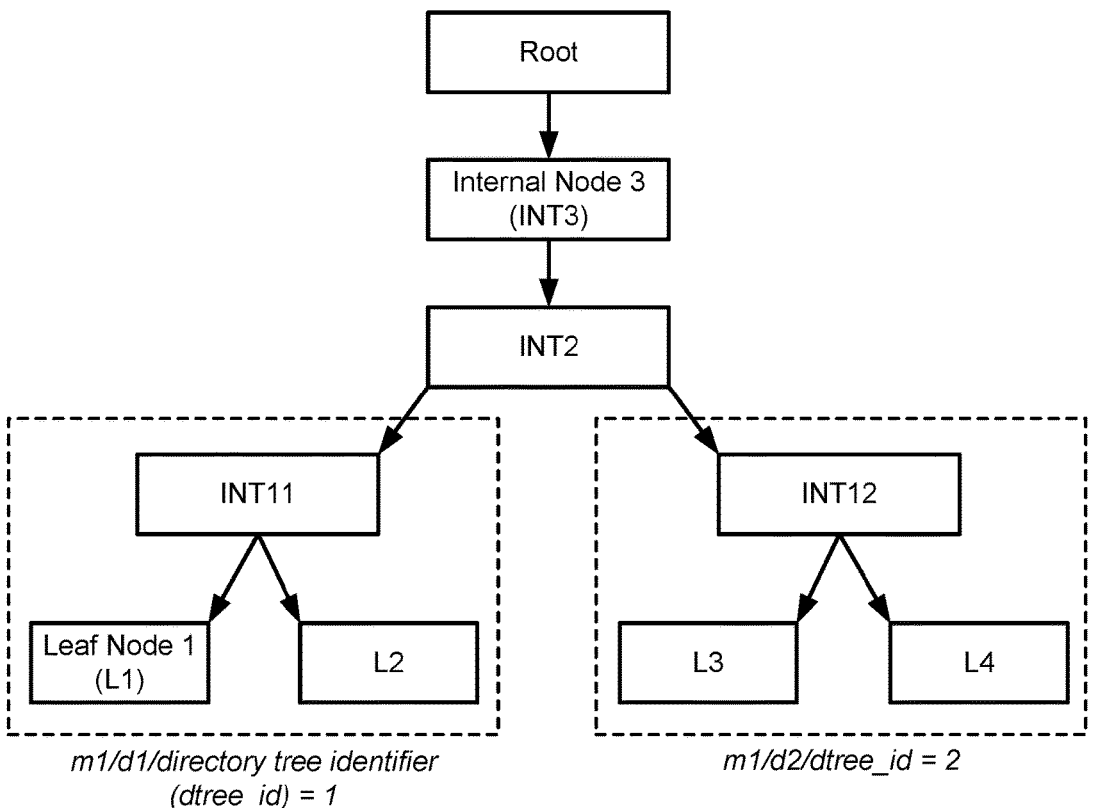
FIG. 2.1 shows example detachable directories in accordance with one or more embodiments disclosed herein.

Turning now to FIG. 2.1, FIG. 2.1 shows example detachable directories in accordance with one or more embodiments disclosed herein. As discussed above (in reference to FIG. 1), a user (of a client (e.g., 110A, FIG. 1)) may want to mark a directory tree (or a directory) as a detachable directory to manage the directory tree as a single unit. By this way, instead of traversing each and every file in the directory tree to delete, copy, or move, for example, a backup set (e.g., backup data), the user may delete, copy, or move the backup set instantaneously (see FIGS. 3-5).

Referring to FIG. 2.1, the file system (e.g., 117, FIG. 1) may be represented by a B+ Tree (discussed below), in which the B+ Tree may include (or specify), for example (but not limited to): a root, one or more internal nodes (e.g., Internal Node (INT) 3, INT2, INT11, INT12, etc.), one or more leaf nodes (e.g., Leaf Node (L) 1, L2, L3, L4, etc.), etc. In one or more embodiments, (i) the directory "m1 (an identifier of a corresponding file system)/d1 (an identifier of a corresponding directory)/directory tree identifier (dtree_id)" (indicated with a dashed line rectangle) is set with "dtree_id=1" where "d1" is marked as a first detachable directory, and (ii) the directory "m1/d2/dtree_id" (indicated with a dashed line rectangle) is set with "dtree_id=2" where "d2" is marked as a second detachable directory. As indicated, with the help of the detachable directories, the B+ Tree is logically divided, at least, to delete, copy, or move data instantaneously.

As used herein, a "B+ Tree" is a variation of a B Tree data structure, in which data pointers are stored only in one or more leaf nodes of the tree. In a B+ Tree, a leaf node (e.g., a node that may have "n" data pointers) differs from the structure of an internal node (e.g., a node that may be present in at least "n/2" data pointers). For example, a leaf node may have an entry for every value of a search field, along with a data pointer (e.g., a pointer to a disk file containing a key value) to a record (or a block that contains the record). As yet another example, leaf nodes may be linked together to provide ordered access to one or more records (for an efficient range-based searches/queries), while internal nodes of a B+ Tree may be used to guide the "data" search. As yet another example, different leaf nodes may be used for data storage, while different internal nodes may be used for dynamic multi-level indexing (said another way, internal nodes may store no data (except one or more keys), only leaf nodes may store the actual data (along with one or more keys)).

In one or more embodiments, a B+ Tree may reduce search time of a record by storing data pointers only at leaf nodes (e.g., reducing the number of disk reads); however, since the data pointers are present only at the leaf nodes, the leaf nodes may need to store all key values along with their corresponding data pointers in order to access them. Further, leaf nodes (e.g., L1, L2, etc.) may form a first level of a multi-level index, with internal nodes (e.g., INT11, INT2, INT3, etc.) forming other levels of the index. To this end, data stored in a B+ Tree may be accessed both sequentially and directly.

In one or more embodiments, in the aforementioned B+ Tree (or the B+ Tree representation), each file may have four keys such as (i) an index node (inode) key (e.g., K1), (ii) a directory entry (dirent) key (e.g., K2), (iii) a case insensitive (CI) hash (e.g., a cryptographic fingerprint) key (e.g., K3), which is generated to perform a case insensitive lookup of entries in a directory, and (iv) a case sensitive (CS) hash key (e.g., K4), which is generated to perform a case sensitive lookup of entries in a directory. In one or more embodiments, file system metadata (described above in reference to FIG. 1) may be organized in such a way that the metadata is stored in the form of the aforementioned keys in the B+ Tree (where the B+ Tree may be considered as a key value store).

For a given directory, one or more keys (e.g., K1-K4) for all assets are co-located (under the directory) because of a "parent inode number" prefix included in all of the keys (see FIG. 2.2), indicating that all the assets under the directory (e.g., child assets under the directory) will inherit the parent inode number/identifier.

As used herein, an "inode" serves as a unique identifier for a specific piece of file system metadata, in which each piece of the metadata describes what one may imagine as a file. As indicated, one or more inodes may operate on different file systems. An inode key/entry may be used more than once but never by the same file system. Further, since an inode entry has a reference to a content handle (that represents corresponding file data), a user may access the inode entry and read contents/data of a corresponding asset.

As used herein, a "directory entry" is a mapping of a filename to its inode (e.g., information to translate from a filename to an inode and get to the actual file, a directory entry has a reference to a corresponding inode, etc.). For example, a directory entry may specify "filename 1: >inode 1". Thereafter, by following "inode 1" entry (e.g., a unique address of (or a pointer to) "inode 1"), all the permissions, attributes (e.g., size, type, owner, etc.), data/contents of a corresponding asset may be determined. From a different perspective, in most cases, a user may access a file by its filename; however, such filenames are not understood by a kernel (of a corresponding client (e.g., 110A, FIG. 1)). To this end, the kernel may identify a file using a corresponding inode (which is unique to that file), in which (i) the inode contains all the data of the file except its identifier/name and the actual data in the file and (ii) such mapping of the filename to its inode is maintained in a corresponding directory entry.

In one or more embodiments, once a directory is set with a "dtree_id" (e.g., m1/d2/dtree_id=2), all its descendants inherit the "dtree_id" (e.g., all its children (generated under the "d2" directory) inherit the corresponding bookkeeping information). Referring to FIG. 1, for example, as soon as a user (via a corresponding client) initiates generation of a directory, the user (via the client) sends a request to the data protection module (e.g., 115, FIG. 1) to mark the directory as a detachable directory (e.g., a detachable directory with its "dtree_id" equals to 2).

Further, one or more B+ Tree entries with different dtree_ids are kept in different set of INT1 and leaf nodes in the B+ Tree. Referring to FIG. 2.1, INT1 is logically separated as "INT11" and "INT12", in which (i) INT11 does not have any assets associated with the "dtree_id=2" and (ii) INT12 does not have any assets associated with the "dtree_id=1". This is possible because all the assets (and/or directories) with the same dtree_id will be co-located in the B+ Tree.

Turning now to FIG. 2.2, FIG. 2.2 shows different key formats used in the B+ Tree (see FIG. 2.1) in accordance with one or more embodiments disclosed herein. In one or more embodiments, (a) an inode key may have the following format: [<dtree_id>:<parent inode no>]:[<dtree_id>:<inode no>], (b) a dirent key may have the following format: [<dtree_id>:<parent inode no>]:[<dtree_id>:<inode no>], (c) a CI hash key may have the following format: [<dtree_id>:<parent inode no>]:<CI hash>, and (d) a CS hash key may have the following format: [<dtree_id>: <parent inode no>]:<CS hash>.

In the aforementioned key formats, (i) few bits in an inode no/number may be reserved for a corresponding "dtree_id", (ii) a corresponding "dtree_id" may be prefixed in an inode number, (iii) a parent inode number may be prefixed in all corresponding keys to make sure that all assets (and/or directories) under a given directory are co-located, and (iv) a corresponding "dtree_id" may be prefixed in all corresponding keys to make sure that detachable directories are generated correctly.

To this end, referring to FIG. 2.1, any assets and/or directories generated under, for example, "m1/d1/dtree_id=1" will inherit the "dtree_id=1" irrespective of the level they are generated in the B+ Tree. Similarly, any assets and/or directories generated under "m1/d2/dtree_id=2" will inherit the "dtree_id=2" irrespective of the level they are generated in the B+ Tree. This arrangement helps to logically group all the assets and/or directories under the same directory tree, and eventually aids to delete, copy, or move an entire directory tree instantaneously.

In one or more embodiments, any directory (at any level in a corresponding namespace) may be set as a detachable directory, but this process needs to be performed when the directory is empty (because a corresponding "dtree_id" needs to be inherited to its descendants/children).

Turning now to FIG. 2.3, FIG. 2.3 shows an example use case to delete a directory tree that is a detachable directory tree in accordance with one or more embodiments disclosed herein. In one or more embodiments, deletion of an "entire" directory tree may be achieved by just dropping/removing a corresponding internal node that represents the directory tree. To this end, all the relevant B+ Tree nodes/pages (e.g., all the assets and/or directories that are pointed by the corresponding internal node) will be garbage collected in a next garbage collection cycle (after being marked for garbage collection by a garbage collector (of the data protection system (e.g., 120, FIG. 1)))).

Referring to FIGS. 2.1 and 2.3, assume here that a user wants to delete the "entire" directory tree of "m1/d2/ dtree_id=2" and this may be achieved instantaneously by dropping INT12 from the B+ Tree (e.g., deleting "m1/d2/ dtree_id=2" by removing the reference of INT12 from INT2). The storage space for INT12, L3, and L4 (e.g., all the assets and/or directories that are related to INT12) may be reclaimed in a next garbage collection cycle. After deleting the directory tree of "m1/d2/dtree_id=2", the B+ Tree will have the structure shown in FIG. 2.3.

Continuing the discussion of the aforementioned use case, if the user accidentally deletes the directory tree of "m1/d2/ dtree_id=2" (e.g., by initiating the "rm-rf" command, in which (i) "rm" means "remove", (ii) "r" refers to a flag to remove directories and their contents recursively, and (iii) "f" means "force" and it overrides any confirmation prompts), one or more embodiments may revert the accidental deletion before the next garbage collection cycle starts (e.g., executing once a week by default). In order to revert and recover from the accidental deletion (e.g., in order to bring back the directory tree of "m1/d2/dtree_id=2"), one or more embodiments may undelete INT12 from the B+ Tree.

Turning now to FIG. 2.4, FIG. 2.4 shows an example use case to copy a directory tree that is a detachable directory tree in accordance with one or more embodiments disclosed herein. In one or more embodiments, copying of an "entire" directory tree may be achieved by just making a reference of a corresponding internal node from one namespace/location to another namespace. To this end, instantaneous copy of the directory tree may be achieved.

Referring to FIG. 2.4, assume here that the data protection system (e.g., 120, FIG. 1) has two different file systems (or partitions), such as "m1" and "m2", in which a corresponding B+ Tree for each of the file systems is illustrated. For example, the B+ Tree associated with "m1" may include (or specify), for example (but not limited to): a root, one or more internal nodes (e.g., INT3, INT2, INT11, INT12, etc.), one or more leaf nodes (e.g., L1, L2, L3, L4, etc.), etc. Further, the B+ Tree associated with "m2" may include (or specify), for example (but not limited to): a root, one or more internal nodes (e.g., INT3, INT2, INT11, etc.), one or more leaf nodes (e.g., L1, L2, etc.), etc.

In this example, (i) the directory "m1/d1/dtree_id" (indicated with a dashed line rectangle) is set with "dtree_id=1" where "d1" is marked as a first detachable directory, (ii) the directory "m1/d2/dtree_id" (indicated with a dashed line rectangle) is set with "dtree_id=2" where "d2" is marked as a second detachable directory, and (iii) the directory "m2/ d3/dtree_id" (indicated with a dashed line rectangle) is set with "dtree_id=3" where "d3" is marked as a third detachable directory. As indicated, with the help of the detachable directories, each of the B+ Trees is logically divided, at least, to delete, copy, or move data instantaneously.

Continuing the discussion of the aforementioned example, assume here that a user wants to copy the directory tree "m1/d2" to "m2" (e.g., copying "d2" of "m1" to "m2", in which "d2" includes INT12, L3, and L4). This may be achieved instantaneously by making/adding a reference to INT12 (of "m1") from INT2 (of "m2"), in which, at the end, "m2" will also include "d2" (and all of its descendants such as INT12, L3, and L4). More specifically, after the copying process is complete, (i) the B+ Tree associated with "m1" will include (or specify), at least, "d1" and "d2", and (ii) the B+ Tree associated with "m2" will include (or specify), at least, "d3" and "d2" (where, prior to the copying process, "d2" was only included in "m1").

Figure 3:
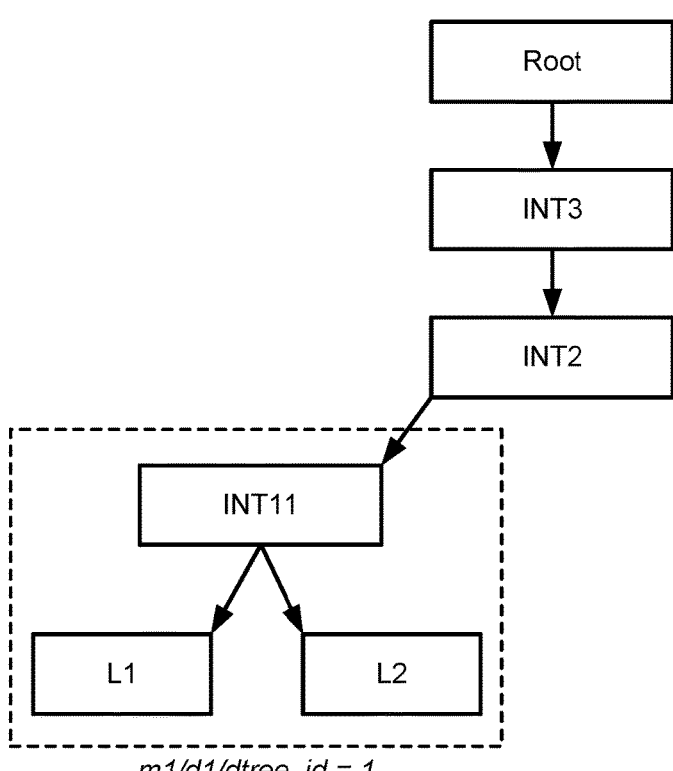
FIG. 3 shows a method for deleting a directory tree that is a detachable directory tree in accordance with one or more embodiments disclosed herein.

FIG. 3 shows a method for deleting a directory tree that is a detachable directory tree in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3, the method shown in FIG. 3 may be executed by, for example, the above-discussed data protection module (e.g., 115, FIG. 1). Other components of the system (100) illustrated in FIG. 1 may also execute all or part of the method shown in FIG. 3 without departing from the scope of the embodiments disclosed herein.

In Step 300, the data protection module receives a directory tree delete request from a requesting entity (e.g., a user of a client (e.g., 110A, FIG. 1), an administrator terminal, an application, etc.) that wants to delete the directory tree (e.g., "d2", FIG. 2.1) from a log-structured file system (e.g., "m1", FIG. 2.1).

In Step 302, in response to receiving the request, as part of that request, and/or in any other manner (e.g., before initiating any computation with respect to the request), the data protection module makes a determination (by employing a set of linear, non-linear, and/or ML models) that the directory tree is marked as a detachable directory. In one or more embodiments, as soon as the user (via the client) initiates generation of the directory tree, the user (via the client) may send a request to the data protection module to mark the directory tree as a detachable directory (in which, once the directory tree is marked, the data set associated with the directory tree may be maintained in such a way that the directory tree can be deleted, copied, or moved instantaneously).

In Step 304, based on the determination (performed in Step 302), the data protection module deletes (in real-time or near real-time) the directory tree by removing a corresponding internal node. For example, referring to FIGS. 2.1 and 2.3, the data protection module may delete instantaneously the directory tree of "m1/d2/dtree_id=2" (e.g., by dropping "INT12" from the B+ Tree or by dropping the "d2").

In Step 306, after deleting the directory tree (in Step 304), the data protection module initiates notification of the user about the completion of the delete request. The notification may include, for example (but not limited to): the deleted assets (and/or directories), the amount of time that has been spent while performing the deletion process, etc.

In one or more embodiments, the notification may also indicate whether the deletion process was completed within the predetermined window, or whether the process was completed after exceeding the predetermined window. The notification may be displayed on a GUI of the client.

In Step 308, after initiating the notification of the user (in Step 306), the data protection module reclaims storage space (for reuse) associated with the directory tree (e.g., the storage space associated with the assets (and/or) directories of the "deleted/delinked" directory tree) in a next garbage collection cycle. In one or more embodiments, the method may end following Step 308.

Figure 4:
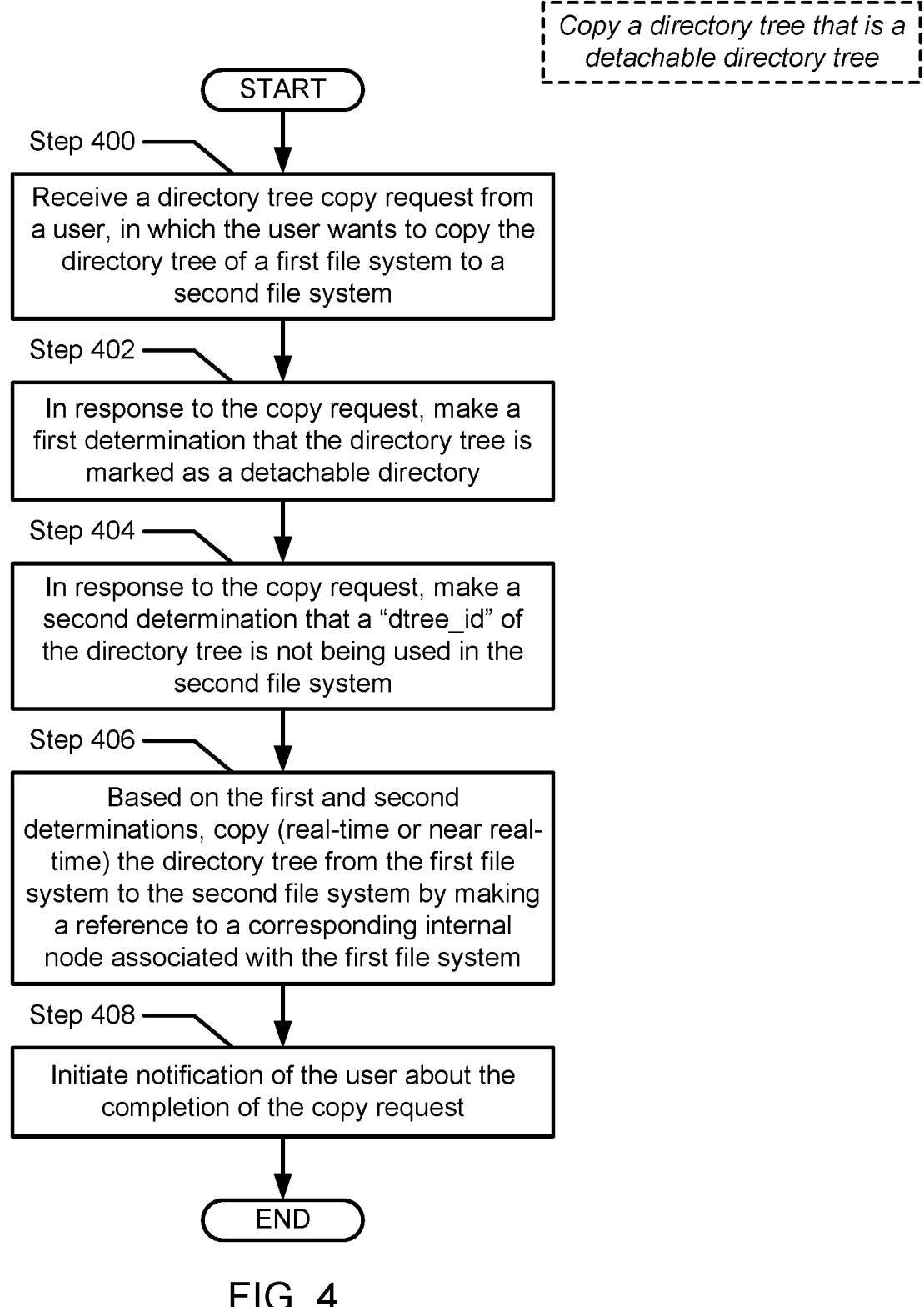
FIG. 4 shows a method for copying a directory tree that is a detachable directory tree in accordance with one or more embodiments disclosed herein.

FIG. 4 shows a method for copying a directory tree that is a detachable directory tree in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4, the method shown in FIG. 4 may be executed by, for example, the above-discussed data protection module. Other components of the system (100) illustrated in FIG. 1 may also execute all or part of the method shown in FIG. 4 without departing from the scope of the embodiments disclosed herein.

In Step 400, the data protection module receives a directory tree copy request from a requesting entity (e.g., a user of a client, an administrator terminal, an application, etc.) that wants to copy the directory tree (e.g., "m1/d2", FIG. 2.4) from a first log-structured file system (e.g., "m1", FIG. 2.4) to a second log-structured file system (e.g., "m2", FIG. 2.4).

In Step 402, in response to receiving the request, as part of that request, and/or in any other manner (e.g., before initiating any computation with respect to the request), the data protection module makes a first determination (by employing a set of linear, non-linear, and/or ML models) that the directory tree is marked as a detachable directory. In one or more embodiments, as soon as the user (via the client) initiates generation of the directory tree, the user (via the client) may send a request to the data protection module to mark the directory tree as a detachable directory (in which, once the directory tree is marked, the data set associated with the directory tree may be maintained in such a way that the directory tree can be deleted, copied, or moved instantaneously).

In Step 404, in response to receiving the request, as part of that request, and/or in any other manner (e.g., before initiating any computation with respect to the request), the data protection module makes a second determination (by employing a set of linear, non-linear, and/or ML models) that a "dtree_id" of the directory tree is not being used in the second file system.

In Step 406, based on the first determination (performed in Step 402) and the second determination (performed in Step 404), the data protection module copies (in real-time or near real-time) the directory tree (e.g., "m1/d2", FIG. 2.4) from the first file system (e.g., "m1", FIG. 2.4) to the second file system (e.g., "m2", FIG. 2.4) by making a reference to a corresponding internal node associated with the first file system (e.g., "INT12" of "m1", FIG. 2.4) from the second file system (e.g., from "INT2" of "m2"). In this manner, the data protection module performs the copying without going through the "entire" directory tree representing, for example, a data backup set to copy corresponding assets one by one to the second file system.

In Step 408, after copying the directory tree (in Step 406), the data protection module initiates notification of the user about the completion of the copy request. The notification may include, for example (but not limited to): the copied assets (and/or directories), the amount of time that has been spent while performing the copying process, etc.

In one or more embodiments, the notification may also indicate whether the copying process was completed within the predetermined window, or whether the process was completed after exceeding the predetermined window. The notification may be displayed on a GUI of the client. In one or more embodiments, the method may end following Step 408.

FIG. 5 shows a method for moving a directory tree that is a detachable directory tree in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5, the method shown in FIG. 5 may be executed by, for example, the above-discussed data protection module. Other components of the system (100) illustrated in FIG. 1 may also execute all or part of the method shown in FIG. 5 without departing from the scope of the embodiments disclosed herein.

In Step 500, the data protection module receives a directory tree move request from a requesting entity (e.g., a user of a client, an administrator terminal, an application, etc.) that wants to move (e.g., delete+copy) the directory tree (e.g., "m1/d2", FIG. 2.4) from a first log-structured file system (e.g., "m1", FIG. 2.4) to a second log-structured file system (e.g., "m2", FIG. 2.4).

In Step 502, in response to receiving the request, as part of that request, and/or in any other manner (e.g., before initiating any computation with respect to the request), the data protection module makes a first determination (by employing a set of linear, non-linear, and/or ML models) that the directory tree is marked as a detachable directory. In one or more embodiments, as soon as the user (via the client) initiates generation of the directory tree, the user (via the client) may send a request to the data protection module to mark the directory tree as a detachable directory (in which, once the directory tree is marked, the data set associated with the directory tree may be maintained in such a way that the directory tree can be deleted, copied, or moved instantaneously).

In Step 504, in response to receiving the request, as part of that request, and/or in any other manner (e.g., before initiating any computation with respect to the request), the data protection module makes a second determination (by employing a set of linear, non-linear, and/or ML models) that a "dtree_id" of the directory tree is not being used in the second file system.

In Step 506, based on the first determination (performed in Step 502) and the second determination (performed in Step 504), the data protection module deletes (in real-time or near real-time) the directory tree (e.g., "d2", FIG. 2.4) by dropping a corresponding internal node (e.g., "INT12" of "m1", FIG. 2.4) from the from the first file system (e.g., "m1", FIG. 2.4).

In Step 508, based on the first determination (performed in Step 502) and the second determination (performed in Step 504), the data protection module copies (in real-time or near real-time) the "deleted" directory tree (in Step 506) from the first file system (e.g., "m1", FIG. 2.4) to the second file system (e.g., "m2", FIG. 2.4) by copying the "dropped" internal node (e.g., "INT12" of "m1", FIG. 2.4) to the second file system.

In Step 510, after the copying the "deleted" directory tree, the data protection module makes a third determination that the "deleted" directory tree is copied to the second file system (e.g., "m2", FIG. 2.4). In one or more embodiment, the data protection module may have an internal process monitoring service that monitors, for example, a status of an ongoing directory tree deletion process, copying process, and/or moving process. The internal process monitoring service may be a computer program that executes on the underlying hardware of the data protection module. Further, the internal process monitoring service may include functionality to control remote procedure calls (e.g., API calls received from the user (via the client)) that try to infer a status of an ongoing process.

In Step 512, after performing the third determination (in Step 510), the data protection module initiates notification of the user about the completion of the move request. The notification may include, for example (but not limited to): the moved assets (and/or directories), the amount of time that has been spent while performing the moving process, etc.

In one or more embodiments, the notification may also indicate whether the moving process was completed within the predetermined window, or whether the process was completed after exceeding the predetermined window. The notification may be displayed on a GUI of the client.

In Step 514, after initiating the notification of the user (in Step 512), the data protection module reclaims storage space (for reuse) associated with the "deleted" directory tree (e.g., the storage space associated with the assets (and/or) direc- tories of the "deleted/delinked" directory tree) in a next garbage collection cycle. In one or more embodiments, the method may end following Step 514.

Turning now to FIG. 6, FIG. 6 shows a diagram of a computing device in accordance with one or more embodi- ments disclosed herein.

In one or more embodiments disclosed herein, the com- puting device (600) may include one or more computer processors (602), non-persistent storage (604) (e.g., volatile memory, such as RAM, cache memory), persistent storage (606) (e.g., a non-transitory computer readable medium, a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instruc- tions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the com- puting device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of com- puting devices exist, and the aforementioned input and output device(s) may take other forms.

The problems discussed throughout this application should be understood as being examples of problems solved by embodiments described herein, and the various embodi- ments should not be limited to solving the same/similar problems. The disclosed embodiments are broadly appli- cable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Descrip- tion, will appreciate that other embodiments can be devised which do not depart from the scope of embodiments as disclosed herein. Accordingly, the scope of embodiments described herein should be limited only by the attached claims.

What is claimed is:

1. A method for managing a file system, the method comprising:

specifying a directory tree as detachable,
  wherein at a time of specifying the directory tree is empty,
  wherein specifying the directory tree as detachable associates the directory tree with a directory tree identifier;
  wherein the directory tree is associated with a B+ tree namespace, comprising a root, internal nodes, and leaf nodes,
populating, after the specifying, the directory tree with at least one internal node and at least one leaf node,
  wherein the at least one internal node and the at least one leaf node are associated with the directory tree identifier, and
  wherein all internal nodes associated with the directory tree and all leaf nodes associated with the directory tree are all co-located under a common internal node and all are associated with the directory tree identi- fier;
receiving, after the populating, a directory tree delete request from a user via a computing device;
in response to the request, making a determination that the directory tree associated with the file system is marked as detachable,
based on the determination and in real-time or near real-time, deleting the directory tree by removing the common internal node from the B+ tree namespace that is associated with the directory tree;
initiating notifying of the user about a completion of the request; and
after the initiating, reclaiming storage space associated with the directory tree in a garbage collection cycle.

2. The method of claim 1, wherein the file system is a log-structured file system, wherein data and metadata asso- ciated with the log-structured file system are written sequen- tially to a log.

3. The method of claim 2, wherein the metadata comprises at least an identifier of a file of the log-structured file system and an access control list associated with the file.

4. The method of claim 2, wherein the B+ tree namespace specifies the metadata based on an index node key, a directory entry key, a case insensitive hash key, and a case sensitive hash key.

5. The method of claim 1, wherein the directory tree represents a full backup of a data set.

6. The method of claim 1, wherein when a second directory tree of a second file system is marked as detachable, data associated with the second directory tree can be deleted instantaneously.

7. The method of claim 6, wherein the second directory tree can only be marked as the detachable when the second directory tree is empty.

8. A method for managing a file system, the method comprising:

specifying a directory tree as detachable, wherein at a time of specifying the directory tree is empty, wherein specifying the directory tree as detachable associates the directory tree with a directory tree identifier;

wherein the directory tree is associated with a B+ tree namespace, comprising a root, internal nodes, and leaf nodes, populating, after the specifying, the directory tree with at least one internal node and at least one leaf node, wherein the at least one internal node and the at least one leaf node are associated with the directory tree identifier, and wherein all internal nodes associated with the directory tree and all leaf nodes associated with the directory tree are all co-located under a common internal node and all are associated with the directory tree identifier;

receiving, after the populating, a directory tree copy request from a user via a computing device, wherein the user wants to copy the directory tree of the file system to a second file system;

in response to the request, making a first determination that the directory tree is marked as detachable;

in response to the request, making a second determination that the directory tree identifier of the directory tree is not being used in the second file system;

based on the first and second determinations and in real-time or near real-time, copying the directory tree from the file system to the second file system by making a reference to the common internal node; and initiating notifying of the user about a completion of the request.

9. The method of claim 8, wherein the file system is a log-structured file system, wherein data and metadata associated with the log-structured file system are written sequentially to a log.

10. The method of claim 9, wherein the metadata comprises at least an identifier of a file of the log-structured file system and an access control list associated with the file.

11. The method of claim 9, wherein the B+ tree namespace specifies the metadata based on an index node key, a directory entry key, a case insensitive hash key, and a case sensitive hash key.

12. The method of claim 8, wherein the directory tree represents an incremental backup of a data set.

13. The method of claim 8, wherein when a second directory tree of a third file system is marked as detachable, data associated with the second directory tree can be copied instantaneously.

14. The method of claim 13, wherein the second directory tree can only be marked as detachable when the second directory tree is empty.

15. A method for managing a file system, the method comprising:

specifying a directory tree as detachable, wherein at a time of specifying the directory tree is empty, wherein specifying the directory tree as detachable associates the directory tree with a directory tree identifier;

wherein the directory tree is associated with a B+ tree namespace, comprising a root, internal nodes, and leaf nodes, populating, after the specifying, the directory tree with at least one internal node and at least one leaf node, wherein the at least one internal node and the at least one leaf node are associated with the directory tree identifier, and wherein all internal nodes associated with the directory tree and all leaf nodes associated with the directory tree are all co-located under a common internal node and all are associated with the directory tree identifier;

receiving, after the populating, a directory tree move request from a user via a computing device, wherein the user wants to move the directory tree of the file system to a second file system;

in response to the request, making a first determination that the directory tree is marked as detachable;

in response to the request, making a second determination that the directory tree identifier of the directory tree is not being used in the second file system;

based on the first and second determinations and in real-time or near real-time, deleting the directory tree from the file system by removing the common internal node from the B+ tree namespace that is associated with the file system, wherein, after the deleting, the directory tree becomes a deleted directory tree;

based on the first and second determinations and in real-time or near real-time, copying the deleted directory tree from the file system to the second file system by copying the common internal node to the second file system;

based on the copying, making a third determination that the deleted directory tree is copied to the second file system;

based on the third determination, initiating notifying of the user about a completion of the request; and after the initiating, reclaiming storage space associated with the deleted directory tree in a garbage collection cycle.

16. The method of claim 15, wherein the file system is a log-structured file system, wherein data and metadata associated with the log-structured file system are written sequentially to a log.

17. The method of claim 16, wherein the metadata comprises at least an identifier of a file of the log-structured file system and an access control list associated with the file.

18. The method of claim 15, wherein the directory tree represents a full backup of a data set.

19. The method of claim 15, wherein when a second directory tree of a second file system is marked as detachable, data associated with the second directory tree can be deleted or copied instantaneously.

* * * * *